(12) United States Patent
Bhandiwad et al.

(10) Patent No.: US 8,275,750 B2
(45) Date of Patent: Sep. 25, 2012

(54) METHOD TO EFFICIENTLY USE THE DISK SPACE WHILE UNARCHIVING

(75) Inventors: Pramod Achyut Bhandiwad, Karnataka (IN); Manjunath Basappa Muttur, Karnataka (IM); Kavitha Ramalingam, Karnataka (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 11/557,795

(22) Filed: Nov. 8, 2006

(65) Prior Publication Data

US 2008/0109498 A1    May 8, 2008

(51) Int. Cl.
*G06F 7/00* (2006.01)
*G06F 17/00* (2006.01)
(52) U.S. Cl. ...................................................... 707/661
(58) Field of Classification Search .................. 707/200
See application file for complete search history.

(56) References Cited

U.S. PATENT DOCUMENTS

| 5,481,701 | A | * | 1/1996 | Chambers, IV | 341/106 |
| 5,495,533 | A | * | 2/1996 | Linehan et al. | 713/155 |
| 5,742,819 | A | * | 4/1998 | Caccavale | 1/1 |
| 5,778,392 | A | * | 7/1998 | Stockman et al. | 1/1 |
| 6,115,710 | A | * | 9/2000 | White | 1/1 |
| 6,807,640 | B2 | * | 10/2004 | Fischer | 713/600 |
| 7,113,962 | B1 | * | 9/2006 | Kee et al. | 1/1 |
| 2001/0042073 | A1 | * | 11/2001 | Saether et al. | 707/203 |
| 2002/0042833 | A1 | * | 4/2002 | Hendler et al. | 709/231 |
| 2004/0172383 | A1 | * | 9/2004 | Yoshida et al. | 707/2 |
| 2004/0210583 | A1 | * | 10/2004 | Enko et al. | 707/10 |
| 2005/0246376 | A1 | * | 11/2005 | Lu et al. | 707/104.1 |
| 2006/0020645 | A1 | * | 1/2006 | Hasegawa et al. | 707/204 |
| 2006/0080282 | A1 | * | 4/2006 | Fujihara et al. | 707/1 |
| 2006/0173848 | A1 | * | 8/2006 | Peterson et al. | 707/9 |

OTHER PUBLICATIONS

Richard Stallman and David; "Ls" 2005 MacKenzie.http://web.archive.org/web/20051109151924/http://www.linuxmanpages.com/man1/ls.1.php.*
Owen, Astrachan; http://web.archive.org/web/20050115094553/http://www.cs.duke.edu/~ola/courses/programming/tar.html; 2005.*
Richard Stallman and David; "Ls" 2005 *http://web.archive.org/web/20051109151924/http://www.linuxmanpages.com/man1/ls.1.php.*
Xiaoming Liu; File-Based Storage of Digital Objects and Constituent Datastreams: XMLtapes adn Internet Archive ARC Files; 2005; Springer-Verlag; pp. 254-265.*
"3 Invoking GNU tar", pp. 1-16, retrieved Jul. 13, 2006 http://www.sunsite.ualberta.ca/Documentation/Gnu/tar-1.13/html_chapter/tar_3.html.

* cited by examiner

*Primary Examiner* — Apu Mofiz
*Assistant Examiner* — Jermaine Mincey
(74) *Attorney, Agent, or Firm* — Yee & Associates, P.C.; Steven Bennett

(57) ABSTRACT

A computer implemented method, data processing system, and computer program product for efficiently using disk space when unarchiving files in the same file system. An archive file is read to identify a total number of data files in the archive file. The number of headers in the archive file is determined based on the total number of data files. A location in a first disk space of a largest data file in the archive file is determined from an offset in a header corresponding to the largest data file. The largest data file is then copied from the first disk space to a second disk space. The first disk space occupied by the largest data file is then released by truncating the archive file. The obtaining, copying, and releasing steps are repeated for each data file in the archive file until all of the data files are unarchived.

12 Claims, 4 Drawing Sheets

METHOD TO EFFICIENTLY USE THE DISK SPACE WHILE UNARCHIVING

BACKGROUND OF THE INVENTION

1. Field of the Invention

The present invention relates generally to an improved data processing system, and in particular, to a computer implemented method, data processing system, and computer program product for efficiently using the disk space when unarchiving files in the same file system.

2. Description of the Related Art

In UNIX® servers, "tar" command is generally used for archiving and unarchiving files. Archiving comprises the process of combining a number of files into a single file, also known as an archive file. Unarchiving comprises the process of reconstructing the original files from the archive. To archive a number of specified data files within UNIX®, "tar" (for Tape Archive) command may be used to create an archive file from the set of data files. To unarchive an archive file, "tar" command is used, which extracts the individual files from the archive file. As "tar" has no built-in data compression abilities, "tar" is often used in tandem with an external compression utility, such as gzip or bzip2, to compress the single file to maximize archive space.

The process of unarchiving files currently requires that an amount of disk space equaling the size of the "tar" file be available. If both the "tar" file and the extracted files are required to be on the same file system, the tar file would extract the files one-by-one to the file system. However, the extraction would stop if there is not enough space on the file system for all of the extracted files. The "tar" file remains unchanged during the process of extraction because the file system is required to have free space equal to the "tar" file for successful extraction. This disk space size requirement can be problematic, since in many cases, a "tar" file may occupy a large amount of disk space, and the amount of space needed to perform the unarchiving is not always available. In these disk space situations, the system administrator must either increase the size of the file system to accommodate the unarchive process, or clear out unwanted files in the file system to make the needed space available.

SUMMARY OF THE INVENTION

The illustrative embodiments provide a computer implemented method, data processing system, and computer program product for efficiently using disk space when unarchiving files in the same file system. An archive file is read to identify a total number of data files in the archive file. The number of headers in the archive file is determined based on the total number of data files. A location in a first disk space of a largest data file in the archive file is determined from an offset in a header corresponding to the largest data file. The largest data file is then copied from the first disk space to a second disk space. The first disk space occupied by the largest data file is then released by truncating the archive file. The obtaining, copying, and releasing steps are repeated for each data file in the archive file until all of the data files are unarchived.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
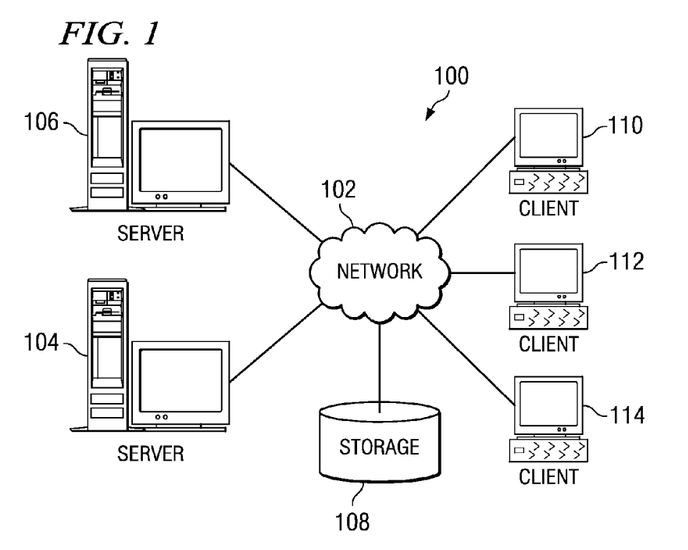
FIG. 1 depicts a pictorial representation of a distributed data processing system in which the illustrative embodiments may be implemented.
Figure 2:
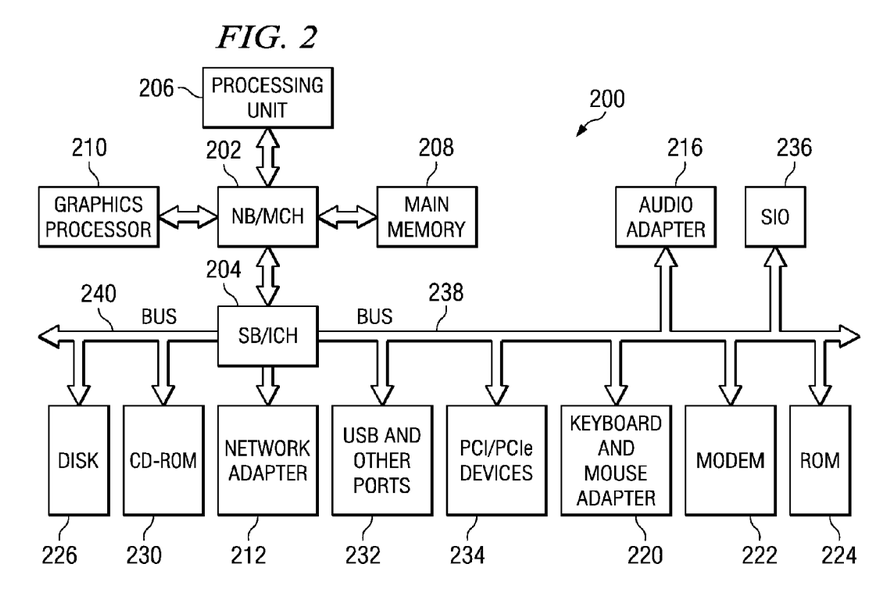
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
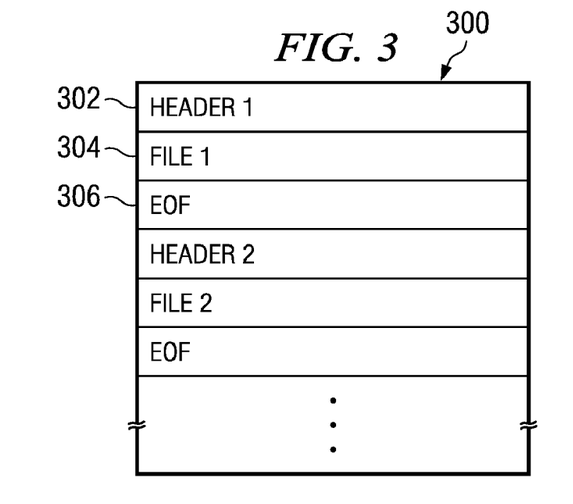
FIG. 3 is an example of a known .tar file format.

FIG. 3 is an example of a known .tar file format. As previously mentioned, a .tar command is used in UNIX® to create a single archive file out of a number of data files. The .tar command stores the archive file in a storage device, such as, for example, storage unit 108 in FIG. 1, main memory 208, hard disk drive (HDD) 226, or CD-ROM drive 230 in FIG. 2.

.Tar file 300 is shown to comprise several data files. The known format of .tar file 300 comprises a header (header 1 302) followed by a data file (data file 1 304), which is followed by an end-of-file marker (EOF 306). Each header, such as header 1 302, comprises metadata about its corresponding data file. This metadata may include the name, version, size, date of last modification, access rights of the data file, checksum, etc. Headers are typically a fixed-size of 512 bytes, with the extra space zero-filled.

A data file, such as data file 304, comprises an actual file, which is written to the archive uncompressed. The length of a data file is typically rounded up to a multiple of 512 bytes, and the extra space is zero-filled. Although other sizes may be used, 512 bytes is commonly used as the header and data file size since .tar was originally designed for tape devices which can be accessed only a block at a time, and 512 bytes was the standard size of a single block.

Following each data file is an end-of-file marker, such as EOF 306. EOF 306 indicates the end of data file 304.

As previously mentioned, the process of unarchiving an archive file such as .tar file 300 in FIG. 3 (and similarly structured archive files) currently requires that an amount of disk space equaling the size of the .tar file be available. This disk space size requirement can be problematic since the amount of space needed to perform the unarchiving may not be available. The illustrative embodiments provide a solution to this problem by allowing files to be unarchived in an efficient manner. In particular, the illustrative embodiments provide an improved archiving format which, when a group of data files is being archived, first stores a number at the beginning of the archive file which indicates the number of data files being archived. A header comprising metadata for the group of data files is also stored in the archive file following the number, and the actual data files to be archived are stored following the header. The data files are ordered in the archive file based on file size in ascending order. The header is also modified to include the offset of each data file location.

When unarchiving an archive file stored using the improved archiving format, the largest data file (the last file in the archive file based on ascending file size) is located using the offset in the header and copied to the local disk space. Once the largest data file has been copied, the .tar file may be truncated, since the archive disk space formerly occupied by the copied data file has now been freed. This freed space in the archive may now be used to copy the remaining data files in the .tar file. The unarchiving process is repeated until all of the data files archived in the .tar file have been copied to the local disk space.

The unarchiving technique in the illustrative embodiments provides an advantage over existing unarchiving methods that require that archive disk space in the amount of the entire .tar file be available for the unarchive process. In contrast, the unarchiving technique in the illustrative embodiments requires less archive disk space to be available for the unarchive process, since only an amount of archive disk space equal to the largest data file in the .tar file is needed to be available. In addition, with the improved archiving format, additional disk space is available for archiving for the end-of-file marker used to indicate the end of each data file is no longer necessary in the improved archive format. As the header now includes the offset of each data file location, the size of the data file (also in the header) may be used with the offset information to calculate the end-of-file. As a result, the amount of archive disk space traditionally occupied by the end-of-file markers (typically 512 byte blocks) in the archive files may now be available for use when archiving.

Although the archive files used in the illustrative embodiments are .tar files, it should be noted that the improved archive format and the unarchiving process may be used with any other archive files which employ the POSIX header format. POSIX is the collective name of a family of IEEE standards that defines a standard application programming interface (API) and environment based on the Unix® operating system to support application portability at the source level. The POSIX header format is further described in FIG. 6 below.

Figure 4:
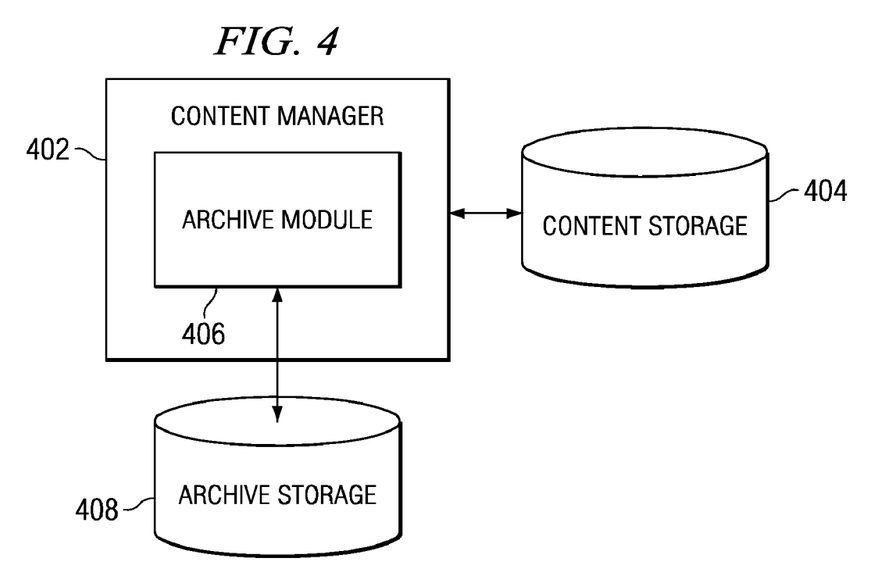
FIG. 4 is a block diagram illustrating exemplary archiving components with which the illustrative embodiments may be implemented.

With reference now to FIG. 4, a block diagram illustrating exemplary archiving components that may be used to implement the illustrative embodiments. Content manager 402 manages content in content storage 404. Content files may be added, deleted, updated, or modified using content manager 402. Content storage 404 may be persistent storage, such as hard disk or magnetic tape storage. In a preferred embodiment, content storage 404 comprises one or more hard disk drives.

Archive module 406 identifies candidate files in content storage 404 and moves these files to archive storage 408, which may be a set of secondary disk drives or magnetic tape drives. Preferably, files are archived into an archive file such as a .tar file. When a request is received for an archived data file, archive module 406 may retrieve the archive file and extract the data files from the archive file. Content manager 402 may then return the requested files to the user.

Content manager 402 may be embodied within a Web server, such as server 104 in FIG. 1, or other device that provides a large amount of content. For example, content manager 402 may be integrated within an electronic mail program, User Network (USENET) news client, message board server, or the like. Content manager 402 may also be integrated within an operating system or file manager. Content manager 402 may then archive files to a portion of the hard drive, such as an archive partition, or to a secondary drive. Other modifications may be made to content manager 402 within the scope of the present invention. For example, content manager 402 and archive module 406 may be implemented on the same computer or on different computers working in cooperation with one another. FIG. 4 is intended as an example, and not as an architectural limitation for the present invention.

Figure 5:
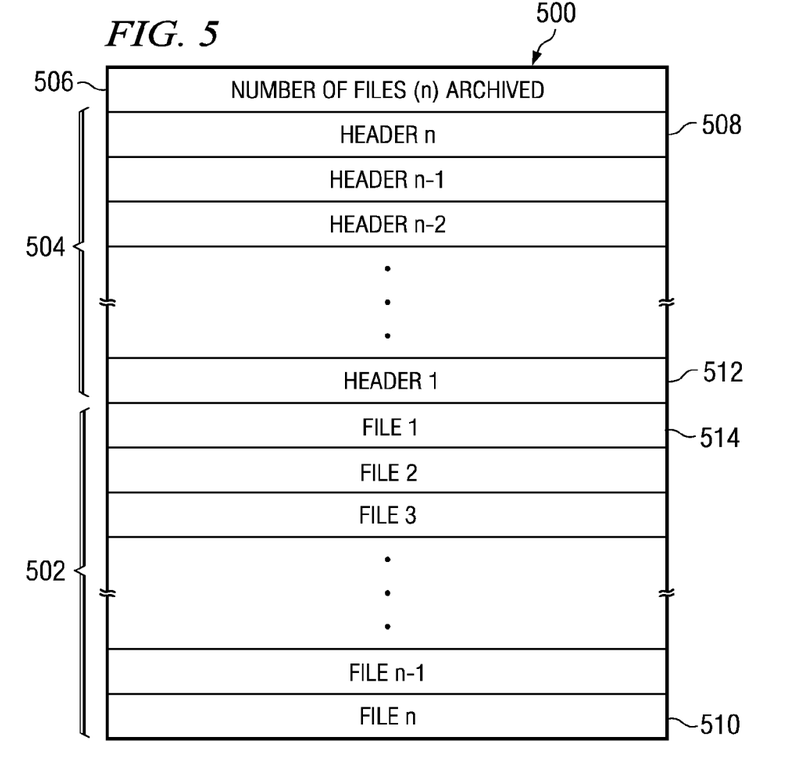
FIG. 5 is an exemplary .tar file format in accordance with the illustrative embodiments.

Turning now to FIG. 5, an exemplary .tar file format in accordance with the illustrative embodiments is shown. The .tar command stores the archive file in a storage device, such as, for example, archive storage 408 in FIG. 4.

In this illustrative example, .tar file 500 comprises archived data files 502, a header 504, and a total number of the data files 506. Total number of data files 506 is placed at the beginning of .tar file 500. This number is used in the unarchiving process to determine the number of headers in the archive file, thereby allowing one to delimit header 504 and archived data files 502.

Header 504 contains all of the headers for archived data files 502. In one embodiment, each header in header 504 adheres to the POSIX header format. Within header 504, the headers are ordered from n to 1, wherein header n 508 refers to the header that references data file n 510, which is the data file occupying the largest amount of archive disk space, and header 1 512 refers to the header that references data file 1 514, which is the data file occupying the least amount of archive disk space. Each header (n to 1) within header 504 comprises metadata about its corresponding data file. This metadata may include the name, version, size, date of last modification, access rights of the data file etc., as per the current POSIX header format for a data file. In addition, the metadata also contains the offset location for the header's corresponding data file in the archive. Each header within header 504 may be a fixed-size of 512 bytes, with the extra space zero-filled.

Archived data files 502 may be written to the archive uncompressed, with the lengths of the data files typically rounded up to a multiple of 512 bytes, and the extra space zero-filled. The data files are sorted in the archive file based on file size in ascending order. As a result, the smallest data file, data file 1 514, is stored first, with the remaining data files following from smallest to largest. Consequently, while the data files are sorted in the archive file from smallest to largest (1 to n), the headers sorted in the reverse order of their corresponding data files (n to 1). This format is desirable in order to easily obtain the location of the largest data file for the unarchiving process, since the header corresponding to the largest data file is located at the top of the archive file. In addition, storing the largest data file at the end of the archive file allows for easily truncating the archive file when the largest data file has been unarchived and copied locally.

With the format of .tar file 500, the unarchiving process is only required to use an amount of archive disk space equal to the amount of space occupied by the largest data file in the archive. When unarchiving, data file n 510 is copied to the local disk space, such as within content storage 404 in FIG. 4. The .tar file may then be truncated since the archive disk space formerly occupied by data file n 512, such as within archive storage 408 in FIG. 4, has now been freed. This freed space may now be used to copy other data files (data file n−1 to 1) in the .tar file until all of the data files have been copied to the disk space. In addition, the last data file in the archive is the largest data file, or data file n 510. End-of-file markers are not necessary in the improved archive format, since the offset of the each data file location may be obtained from the header itself. Based on the data file size and the offset, the end-of-file may be easily calculated. Since the traditional archiving format typically uses 512-byte blocks as the end-of-file markers for each data file, the improved archive format also frees up this disk space for archiving.

Figure 6:
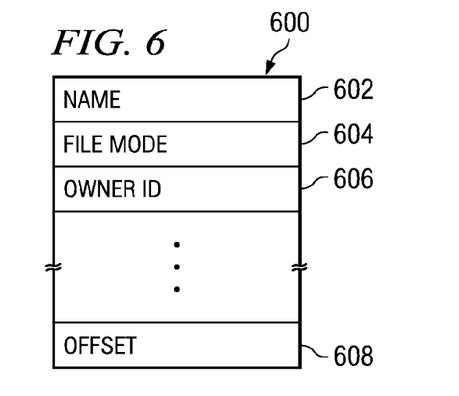
FIG. 6 is an exemplary header format in accordance with the illustrative embodiments.

FIG. 6 is an exemplary header format in accordance with the illustrative embodiments. Header format 600 may be used within a .tar file, such as within header n 508 within .tar file 500. Header format 600 includes the name 602, file mode 604, owner ID 606 of the .tar file, etc., as per the POSIX header format. In addition to comprising features presently found within the current POSIX header format, header format 600 in the illustrative embodiments also includes a new attribute, offset 608. Offset 608 is used in header format 600 to point to the location of the header's corresponding data file in the file system.

Figure 7:
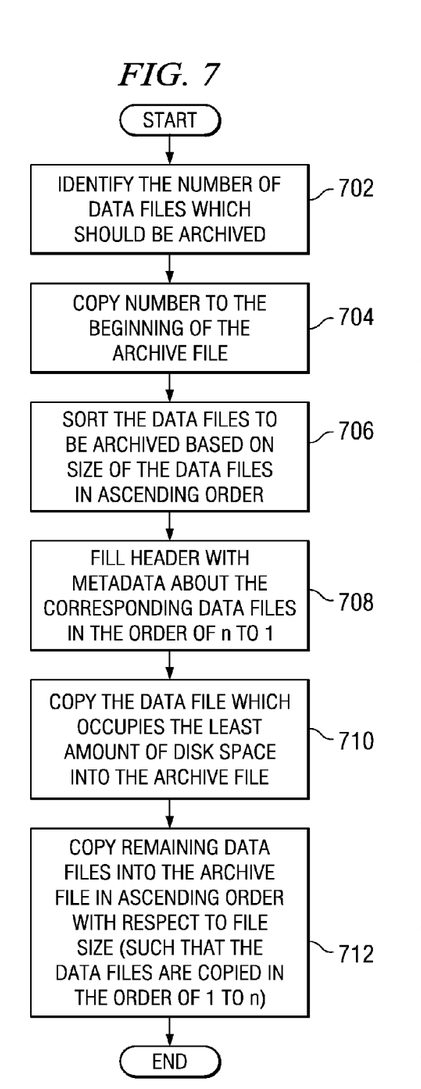
FIG. 7 is a flowchart of a process for archiving files in accordance with the illustrative embodiments.

FIG. 7 is a flowchart of a process for archiving files in accordance with the illustrative embodiments. The archive process in FIG. 7 creates an archive file in the format as illustrated above in FIG. 5. The process begins with an archive module in a content manager identifying the number of data files which should be archived (step 702). The archive module then copies this number to the beginning of the archive file (step 704).

The archive module sorts the data files that should be archived based on size of the data files in ascending order (step 706). The header, such as header 600 in FIG. 6, is filled with metadata about the corresponding data files in the order of n to 1 (step 708). As shown in FIG. 5, header n is the header referring to the largest data file in the archive group, or data file n. Header 1 is the header referring to the smallest data file in the group, or data file 1.

Once the header is filled in, the archive module copies the data file occupying the least amount of disk space, such as data file 1 (step 710). The remaining data files are then copied into the archive file in ascending order with respect to file size (step 712), such that the data files are copied in the order of 1 to n, with the process terminating thereafter. The archive file format is structured to have the header ordered from n to 1 (referring to the largest data file (data file n) first), and the data files ordered from 1 to n, so that the largest data file in the archive may be easily located since it is the first entry in the header. The largest data file is the first data file to be unarchived since it will free the largest amount of disk space with which to unarchive the other data files.

Figure 8:
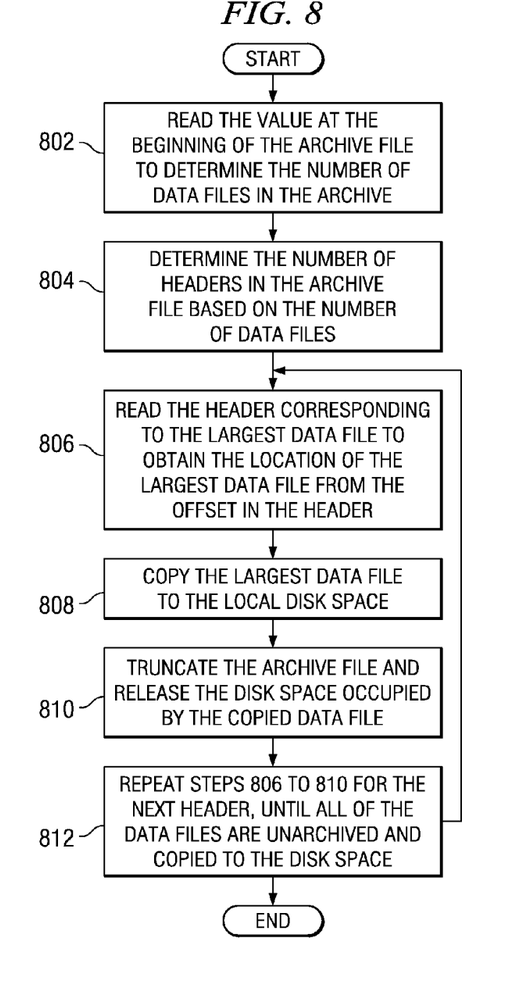
FIG. 8 is a flowchart of a process for unarchiving files in accordance with the illustrative embodiments.

FIG. 8 is a flowchart of a process for unarchiving files in accordance with the illustrative embodiments. The unarchive process in FIG. 8 extracts the data files from an archive file format as illustrated above in FIG. 5. The archive file may be stored within a storage device such as archive storage 408 in FIG. 4.

The process begins with an archive module in a content manager reading the value at the beginning of the archive file to determine the number of data files in the archive file (step 802). From the number of data files, number of headers may be determined (step 804). Determining the number of headers allows the archive module to delimit the headers and the data.

Once the number of headers in the archive file is known, the archive module may read the header in the archive file corresponding to the largest data file ("header n") to obtain the location of the largest data file ("data file n") from the offset in the header (step 806). The archive module then accesses that location and begins copying data file n to the local disk space, such as to content storage 404 in FIG. 4 (step 808).

When the nth data file has been copied, a truncate command, such as ftruncate( ), may be called by the archive module to truncate the archive file and release the archive disk space occupied by the data file (step 810). The disk space once occupied by the archived data file is freed and now available to be used for extracting and copying the next data file in the archive file. The next header in the archive file may then be read, and the process steps in steps 806 to 810 may be repeated until all of the data files are unarchived and copied to the local disk space (step 812), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for unarchiving data files, the computer implemented method comprising:
   reading a value at a beginning of an archive file that specifies a total number of data files in the archive file, wherein the archive file is stored on a first disk space, wherein the data files in the archive file are sorted in ascending order based on file size;
   determining a number of headers in the archive file based on the total number of data files in the archive file, wherein the number of headers are sorted in reverse order for their corresponding data files;

locating a largest data file in the archive file from an offset in an archive file header corresponding to the largest data file in the archive file;

unarchiving the largest data file, wherein unarchiving the largest data file comprises copying the largest data file from the archive file to a second disk space;

releasing an amount of the first disk space occupied by the largest data file in the archive file by truncating the archive file, wherein the amount of the first disk space is equal to a size of the largest data file, and wherein at least a portion of the amount of the first disk space that is released is used for extracting the next file in the archive file; and repeating the locating, unarchiving, and releasing for each largest data file in the archive file until all of the data files are unarchived.

2. The computer implemented method of claim 1, wherein the archive file comprises a block indicating the number of data files in the archive file, followed by headers for each data file in the archive file, followed by the data files.

3. The computer implemented method of claim 1, wherein the number of headers is determined to allow for delimiting the number of headers and data files.

4. The computer implemented method of claim 1, wherein the archive file is archived by:

identifying the number of data files to be archived;

copying the number to the beginning of the archive file;

sorting the data files to be archived in ascending order based on size;

filling the headers with metadata about their corresponding data file, wherein the headers are sorted in a reverse order in the archive file of their corresponding data files; and copying each data file into the archive file in the ascending order.

5. A data processing system for unarchiving data files, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to read a value at a beginning of an archive file that specifies a total number of data files in the archive file, wherein the archive file is stored on a first disk space, wherein the data files in the archive file are sorted in ascending order based on file size, to determine a number of headers in the archive file based on the total number of data files in the archive file, wherein the number of headers are sorted in reverse order for their corresponding data files, to locate a largest data file in the archive file from an offset in an archive file header corresponding to the largest data file in the archive file, to unarchive the largest data file, wherein unarchiving the largest data file comprises copying the largest data file from the archive file to a second disk space, to release an amount of the first disk space occupied by the largest data file in the archive file by truncating the archive file, wherein the amount of the first disk space is equal to a size of the largest data file, and wherein at least a portion of the amount of the first disk space that is released is used for extracting the next file in the archive file, and to repeat the determining the location, copying, and releasing for each largest data file in the archive file until all of the data files are unarchived.

6. The data processing system of claim 5, wherein the archive file comprises a block indicating the number of data files in the archive file, followed by headers for each data file in the archive file, followed by the data files.

7. The data processing system of claim 5, wherein the number of headers is determined to allow for delimiting the number of headers and data files.

8. A computer program product for unarchiving data files, the computer program product comprising:

a computer recordable storage medium having computer usable program code stored thereon, the computer usable program code comprising:

computer usable program code for reading a value at a beginning of an archive file that specifies a total number of data files in the archive file, wherein the archive file is stored on a first disk space, wherein the data files in the archive file are sorted in ascending order based on file size;

computer usable program code for determining a number of headers in the archive file based on the total number of data files in the archive file, wherein the number of headers are sorted in reverse order for their corresponding data files;

computer usable program code for locating a largest data file in the archive file from an offset in an archive file header corresponding to the largest data file in the archive file;

computer usable program code for unarchiving the largest data file, wherein unarchiving the largest data file comprises copying the largest data file to a second disk space;

computer usable program code for releasing an amount of the first disk space occupied by the largest data file in the archive file by truncating the archive file, wherein the amount of the first disk space is equal to a size of the largest data file, and wherein at least a portion of the amount of the first disk space that is released is used for extracting the next file in the archive file; and computer usable program code for repeating the locating, unarchiving, and releasing for each largest data file in the archive file until all of the data files are unarchived.

9. The computer program product of claim 8, wherein the archive file comprises a block indicating the number of data files in the archive file, followed by headers for each data file in the archive file, followed by the data files.

10. The computer program product of claim 8, wherein the number of headers is determined to allow for delimiting the number of headers and data files.

11. The computer program product of claim 8, wherein the archive file is archived by computer usable program code comprising:

computer usable program code for identifying the number of data files to be archived;

computer usable program code for copying the number to the beginning of the archive file;

computer usable program code for sorting the data files to be archived in ascending order based on size;

computer usable program code for filling the headers with metadata about their corresponding data file, wherein the headers are sorted in a reverse order in the archive file of their corresponding data files; and computer usable program code for copying each data file into the archive file in the ascending order.

12. The computer implemented method of claim 1, wherein the archive file comprises:

a number at the beginning of the archive file, wherein the number indicates a total number of data files archived;

a plurality of headers following the number in the archive file, wherein each header in the plurality of headers comprises metadata about an archived data file; and a plurality of data files following the plurality of headers in the archive file, wherein the data files are sorted in ascending order based on size, and wherein the plurality of headers are sorted in a reverse order of their corresponding data files.

* * * * *